A. P. MALYSHEFF.
MACHINE FOR TESTING.
APPLICATION FILED NOV. 7, 1916.
1,348,026.
Patented July 27, 1920.
2 SHEETS—SHEET 1.
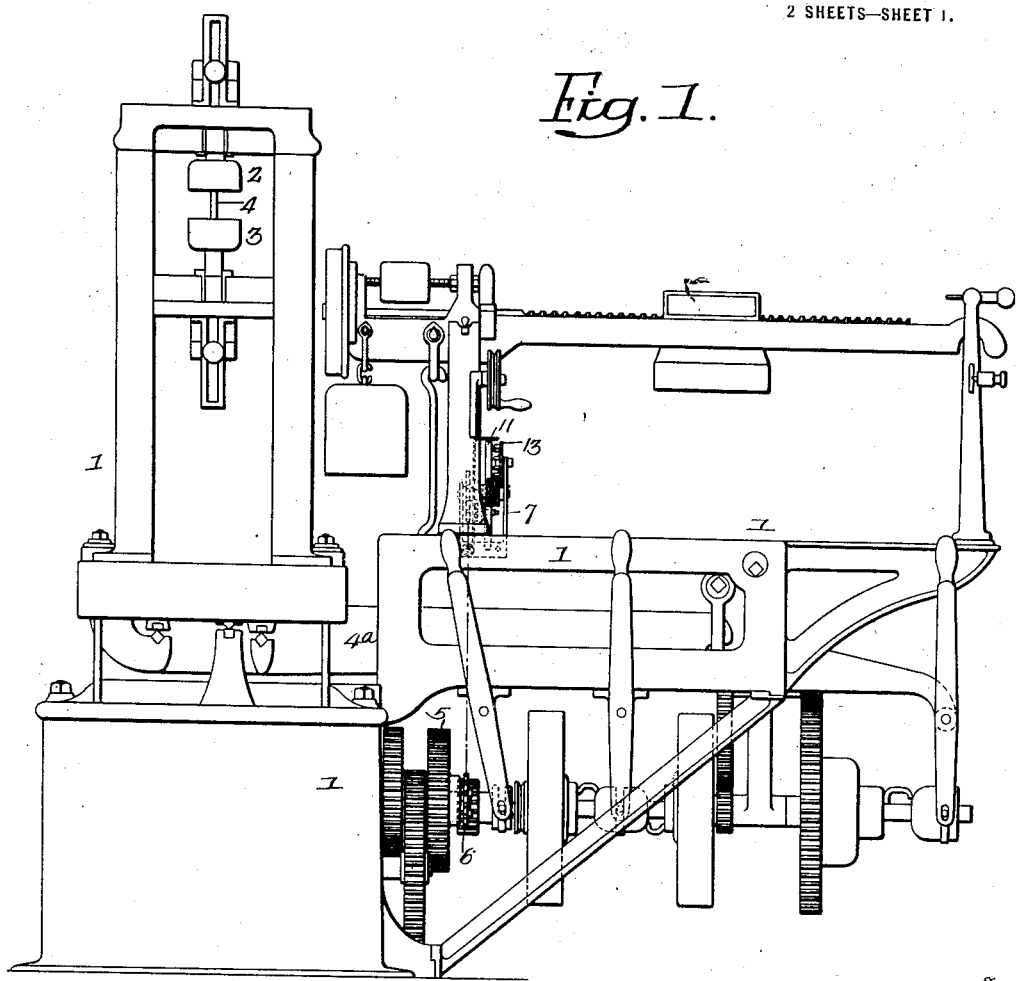
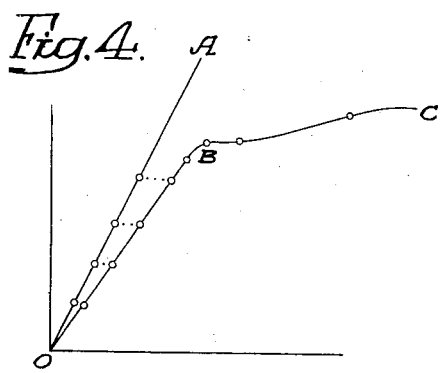
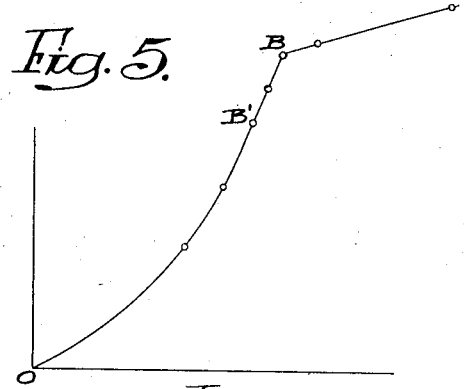
Inventor—
Alexander P. Malysheff.
by his Attorneys
Howson & Howson A. P. MALYSHEFF.
MACHINE FOR TESTING.
APPLICATION FILED NOV. 7, 1916.
1,348,026.
Patented July 27, 1920.
2 SHEETS—SHEET 2.
Fig. 2. Fig. 3.
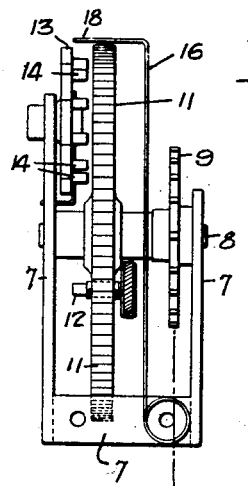
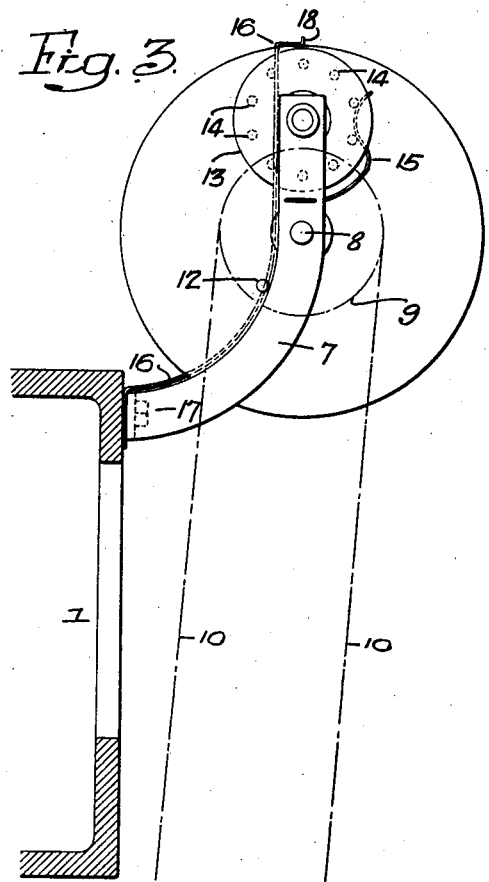
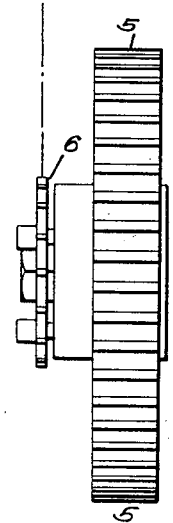
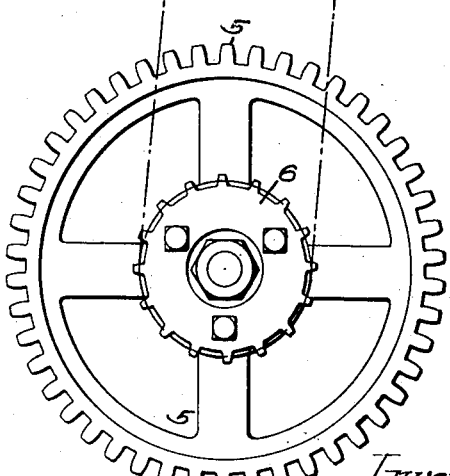
Inventor.
Alexander P. Malysheff
by his Attorneys.
Howson + Howson

UNITED STATES PATENT OFFICE.

ALEXANDER P. MALYSHEFF, OF TOMSK, RUSSIA, ASSIGNOR TO TINIUS OLSEN TESTING MACHINE COMPANY, OF PHILADELPHIA, PENNSYLVANIA, A CORPORATION OF PENNSYLVANIA.

MACHINE FOR TESTING.

1,348,026.

Specification of Letters Patent.

Patented July 27, 1920.

Application filed November 7, 1916. Serial No. 130,033.

*To all whom it may concern:*

Be it known that I, ALEXANDER P. MALYSHEFF, a subject of the Emperor of Russia, and a resident of Tomsk, Russia, have invented Machines for Testing, of which the following is a specification.

One object of my invention is to provide a novel and relatively simple method of operation whereby it is possible to determine the elastic limit of a test specimen with greater ease and in less time than has hitherto been possible, it being particularly desired that the procedure shall be such as to be applicable to and particularly advantageous with specimens of comparatively small dimensions or of what would ordinarily be unavailable shapes.

A further object of the invention is to provide a simple and sufficiently exact method of determining the elastic limit of a specimen under test, which shall involve the simultaneous deformation of such specimen and of certain parts of the testing machine itself, and the indication or observation of the point at which the deformation of said specimen ceases to be proportional to the applied stress as this is increased.

I also desire to provide a novel device which may be conveniently applied to testing machines, for determining the elastic limit of specimens under test, in accordance with the above noted method.

These objects and other advantageous ends I secure as hereinafter set forth, reference being had to the accompanying drawings, in which, Figure 1 is an elevation illustrating a testing machine with my device applied thereto;

Figs. 2 and 3 are elevations on a larger scale than Fig. 1, taken at right angles to each other, the latter figure being partly in section, illustrating a form of the device for carrying out my novel method; and Figs. 4 and 5 are diagrams illustrating the results obtained by my method and machine.

It is customary at the present time to determine the elastic limit or point at which the deformation of a specimen under test ceases to be proportional to the applied stress, by subjecting such specimen to an increasing load and making a series of measurements or observations of the amount of deformation of the specimen resulting from each increase of load, until a point is reached at which such deformation is no longer proportional to the load increase.

Such a method of operation not only requires considerable time and care in making the necessary observations and measurements but it is extremely difficult to carry out upon certain test specimens of small size or of certain shapes. Since however for most practical purposes, it is not necessary to ascertain the absolute amounts of the deformation of the specimen resulting from each change of load, I have found that the desired result (*i. e.*, the sufficiently accurate determination of the elastic limit of a test specimen) may be obtained by noting the combined deformation of the piece under test and of certain parts of the testing machine itself, resulting from each increase of load or stress;—it being assumed that deformation of the parts of the machine shall be within the elastic limit of said parts.

Regardless therefore of the dimensions or shape of the test specimen, it is possible by the use of suitable apparatus, to accurately determine the point and hence the load, at which this combined deformation and therefore the deformation of the test specimen, is no longer proportional to said load, and while many devices or combinations of parts may be provided for carrying out this method, I have illustrated one which I have found to give satisfactory results.

In the above drawings, 1 represents the frame of a testing machine having suitable holding devices 2 and 3 for gripping a specimen under test and the first of these devices is attached to or forms part of a fixed portion of said machine while the second, indicated at 3, is connected to and actuated by suitable mechanism well known to the art whereby some form of stress, such as tension, compression, bending, etc., may be applied to the test specimen 4.

In the present instance, the parts are arranged to apply tension to such a specimen and for this purpose the movable member $4^a$ of the testing machine is actuated through any desired and suitable train of mechanism from a source of power. For purposes of this invention I connect to a suitable element of this train of mechanism such as the gear wheel 5, a sprocket 6 and at some convenient point upon the frame 1, I mount a bracket 7 providing bearings for a horizontal shaft 8 which extends in a line parallel to the axis of rotation of the gear or other element 5. On this shaft is fixed a second sprocket 9 operatively connected to the sprocket 6 by a chain 10 although obviously any other suitable means for transmitting movement from the element 5 to the shaft 8 may be provided without departing from my invention. Also fixed to the shaft 8 is a wheel or disk 11 having its periphery graduated in any suitable units, and in the present instance having one hundred divisions upon its edge. This disk or wheel 11 has extending through it parallel to its axis of rotation a pin 12 in the form of a screw which may be adjusted in said disk at will to cause its end to project to a greater or less distance beyond one of its sides.

Also rotatably mounted on the bracket 7 is a second disk 13 smaller in diameter than the disk 11 and carrying a series of pins or teeth 14 projecting perpendicularly to one of its faces in such positions that one of them will be engaged by the pin 12 (when this is properly projected) each time the disk 11 makes a revolution. In the present instance there are ten of the pins 14 carried by the disk 13, so that each time one of them is engaged by the pin 12, said second or smaller disk is turned through one-tenth of a revolution.

A suitable device, such as a spring wire 15 carried by the bracket 7, is provided to engage the pins 14 so as to insure the disk 13 being always held in a position in which one of its pins may be engaged by the pin 12, and said spring also serves to limit each movement of said second disk and retain it in a given position during the times when its pins are disengaged. An indicator or pointer 16 is provided in the form of a wire clamped between the bracket 7 and the frame 1, to which said bracket is held by suitable bolts 17, the arrangement being such that the free end of said pointer extends adjacent the graduated periphery of the disk 11 as well as that of the disk 13, which in the present instance has ten graduations or divisions thereon.

Under operating conditions, when a test specimen is engaged by the gripping or holding devices 2 and 3 of the testing machine and the mechanism of said machine is set in operation to apply tension, for example, to said specimen, it is obvious that movement will be imparted to the disk 11 from the element 5, through the sprocket 6, chain 10, sprocket 9 and shaft 8. This movement is due to or is made up of one component depending upon the deformation of the test specimen, plus a second component resulting from the deformation of the testing machine itself under the load applied to the specimen, together with a third component which gradually disappears, resulting from the lost motion or clearances between the elements of the machine. The total resulting movement made by all of these three components is conveniently observed by noting the number of divisions upon the periphery of the disk 11 passing under the end 18 of the pointer 16, or if said disk makes more than one revolution, by noting the number of divisons on the periphery of the disk 13 which pass the pointer, as the load on the test specimen is gradually incresed.

With such an arrangement of parts, it is an easy matter to note the point at which the number of divisions on the periphery of the wheel 11, passing the pointer 16, ceases to be proportional to the increase of the load applied to the specimen under test, and when such point is noted the applied load is an indication of the elastic limit of the specimen.

In order to represent the conditions existing in carrying out the above method, curves may be plotted in which the abscissas are units of the deformation and the ordinates are units of load. The deformation of the machine under the increasing load may then be represented by the straight line OA, Fig. 4, and the combined deformation of the test specimen and of the machine will in a typical case be represented by the curve OBC; the elastic limit being indicated by the point B.

Owing to the clearances or lost motion of the parts of the machine interposed between the test specimen and the indicating device, the line OB is not straight but actually has the shape indicated in Fig. 5 by the line OB'B. Since, however, the component of the movement of the graduated disk 11 due to this lost motion becomes zero before the elastic limit is reached, the part B'B of this curve is practically a straight line, so that the accurate determination of the point B is not interfered with.

In order to obtain the best results I preferably mount my device at a position on the testing machine where it will be most convenient to the operator and connect it to the mechanism of said machine at such a point as to minimize the effect of the clearances or lost motion between the parts. The dimensions of the apparatus are so chosen as to render the effects of the deformation of the test specimen plainly visible and when for any reason the testing machine is operated at high speed, the pin 12 may be withdrawn by operating the screw of which it forms a part so that it will not engage the pins 14.

Under operating conditions the device will continue in action until rupture of the specimen occurs, so that it is possible for observations to be made not only while the load is being increased but also after the maximum load has been applied In attaching the test piece to the members 2 and 3 of the testing machine, I preferably provide some special form of holder such for example as will receive the threaded or other suitably formed ends of the specimen, so that there will be no movement of the indicating device due to slipping, as would be the case if holders employing wedges were used.

I claim:—

1. The combination of a machine for causing deformation of a test specimen; weighing mechanism for indicating the amount of stress applied to said specimen; and means in addition to said weighing mechanism for indicating the combined deformation of said specimen and of the machine.

2. The combination in a testing machine of a member connected to a test specimen; a train of mechanism for moving said member to cause deformation of said specimen; and a device connected to said mechanism for indicating the combined deformation of the specimen and of said mechanism.

3. The combination in a testing machine of a fixed and a movable member for connection to a test specimen; mechanism including a rotary element for causing one of said members to move relatively to the other to exert stress upon said specimen; a device including an element driven from said rotary member; and an indicator mounted to coöperate with said element to show the combined deformation of the machine and specimen.

4. The combination in a testing machine of two members for engaging a specimen under test; mechanism including a rotary element for moving one of said members relatively to the other to exert a stress upon said specimen; a sprocket operatively connected to said element; a rotary shaft; a second sprocket on said shaft; means for operatively connecting said sprockets; a graduated disk on the shaft; with a relatively fixed indicator extending adjacent the graduated disk.

ALEXANDER P. MALYSHEFF.